United States Patent [19]
Ohmura et al.

[11] Patent Number: 4,833,495
[45] Date of Patent: May 23, 1989

[54] LENS-FITTED PHOTOGRAPHIC FILM PACKAGE

[75] Inventors: Hiroshi Ohmura, Tokyo; Yasuo Matsumoto; Shigeru Sugimoto, both of Kanagawa; Seimei Ushiro, Tokyo; Seiji Asano, Saitama; Toshio Yoshida, Ibaragi, all of Japan

[73] Assignee: Fuji Photo Film Co., Ltd., Kanagawa, Japan

[21] Appl. No.: 111,416

[22] Filed: Oct. 20, 1987

[30] Foreign Application Priority Data

Oct. 20, 1986 [JP] Japan .................. 61-160206
Feb. 13, 1987 [JP] Japan .................. 62-19740
Feb. 14, 1987 [JP] Japan .................. 62-20197
Feb. 18, 1987 [JP] Japan .................. 62-34910

[51] Int. Cl.[4] .................. G03B 1/00; G03B 17/26
[52] U.S. Cl. .................. 354/212; 354/275; 354/288
[58] Field of Search .............. 354/212, 214, 275, 288

[56] References Cited

U.S. PATENT DOCUMENTS

| 2,566,267 | 8/1951 | Wallace | 354/214 |
| 3,490,349 | 1/1970 | Steisslinger et al. | 354/214 |
| 3,567,147 | 3/1971 | Engelsmann et al. | 354/212 |
| 4,332,453 | 6/1982 | Seely et al. | 354/212 |
| 4,440,483 | 4/1984 | Linke et al. | 354/212 |
| 4,455,074 | 6/1984 | Wong et al. | 354/214 |
| 4,469,421 | 9/1984 | Kamata . | |
| 4,609,271 | 9/1986 | Watanabe | 354/288 |
| 4,655,574 | 4/1987 | Fields | 354/212 |

FOREIGN PATENT DOCUMENTS 6708464 3/1968 Netherlands .
WO82/03926 11/1982 World Int. Prop. O. .
WO82/03927 11/1982 World Int. Prop. O. .

Primary Examiner—A. A. Mathews
Attorney, Agent, or Firm—Young & Thompson

[57] ABSTRACT

A lens-fitted photographic film package comprises a light-tight film case having exposure structure, a rolled film in a film roll receiving chamber disposed on one side of an exposure frame in the light-tight case, and a removable film container having a film winding spool therein disposed on the other side of the exposure frame in the light-tight film case. A member is provided for causing the film to be advanced smoothly without getting scratched, for preventing the film roll from becoming loose, and for preventing the film from being gouged by a film exit slot of the film roll receiving chamber.

11 Claims, 6 Drawing Sheets

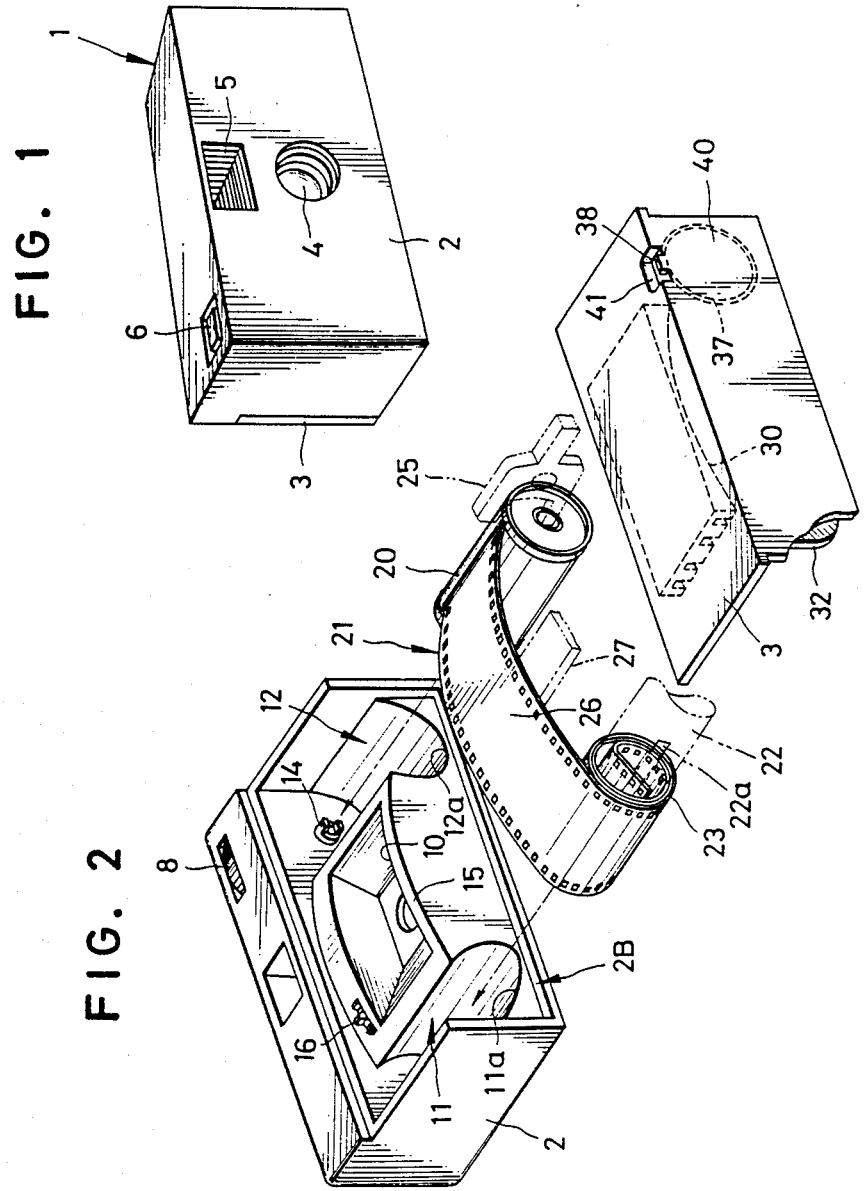

FIG. 3
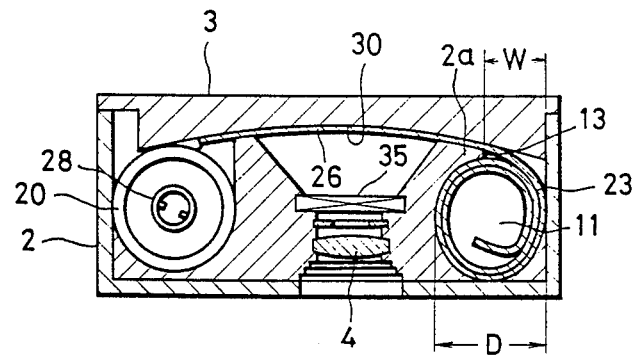
FIG. 4
PRIOR ART
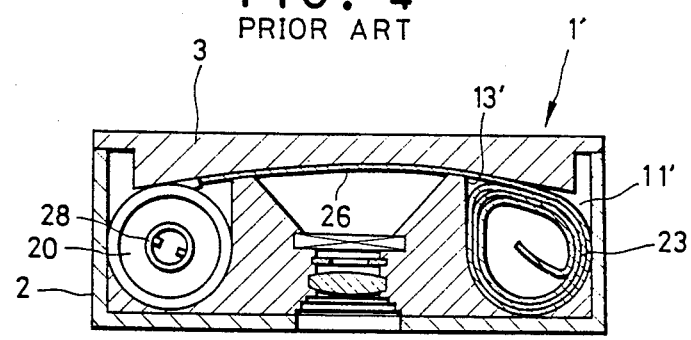
FIG. 5A  FIG. 5B  FIG. 5C
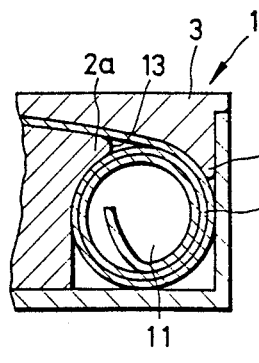 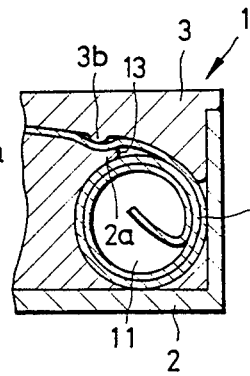 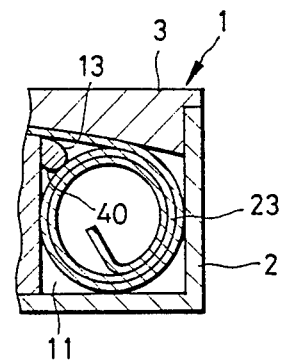

FIG. 8A PRIOR ART   FIG. 8B PRIOR ART   FIG. 8C PRIOR ART
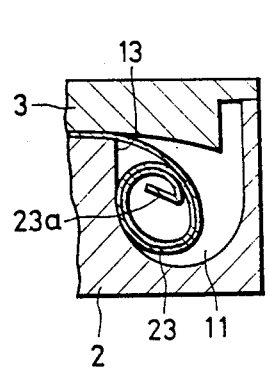
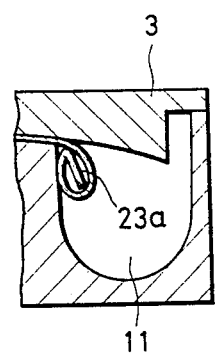
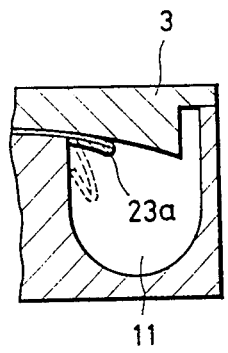
FIG. 9
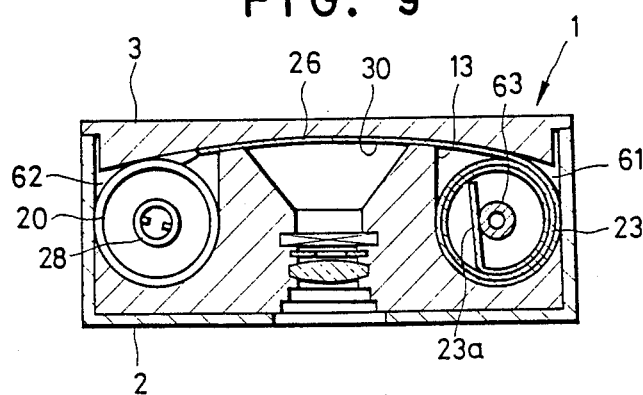
FIG. 10A
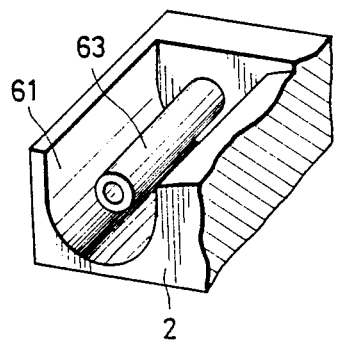
FIG. 10B
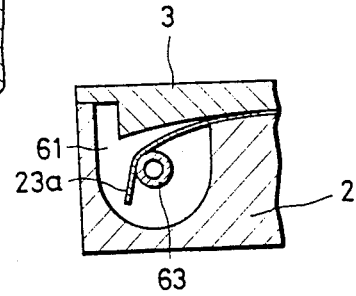

LENS-FITTED PHOTOGRAPHIC FILM PACKAGE

BACKGROUND OF THE INVENTION

The present invention relates to a lens-fitted photographic film package which has a taking lens attached to a light-tight film case, an exposure member with its associated elements incorporated in the light-tight film case, and a photographic film previously loaded in the photographic film case as an integral whole.

A known lens-fitted photographic film package comprises a film case fitted with a taking lens, a simple exposure mechanism which includes a film winding mechanism and a shutter mechanism with their associated elements incorporated in the film case, and a 110-size cartridge film previously packaged in the film case. As the lens-fitted photographic film package has no conventional back cover for allowing loading and unloading a film and no complex exposure control mechanism, a low manufacturing cost has been achieved. The lens-fitted photographic film package, after the exposure of all frames of the film, is forwarded to a photo shop or photo laboratory without removing the film. There, the exposed film is removed by breaking open the film package and then developed to make prints therefrom while the film package without film is scrapped. The prints together with the developed film are returned to the customer. The lens-fitted single-use film package makes it easy to take pictures because there is no film loading and unloading.

As is well known in the art, the 110-size film cartridge has a roll of 110-size film strip contained light-tightly therein. The film package can be assembled by inserting the film cartridge into an exposure chamber formed inside the lens-fitted film case. Thanks to the use of cartridge film, not only the assembly of the film package but also the removal of the film cartridge from the film package can be effected in a daylight room without fogging the film in the cartridge.

However, it is hard to make an enlarged print with good image quality from the 110-size film. For improving image quality, it has been proposed to provide a lens-fitted film package including a 135-size roll film whose image size is 36×24 mm. When incorporating the 135 mm-size roll film defined by International Standardization Organization (ISO code 1007: 1979 Edition) in such a lens-fitted film package, it is preferred to encase a rolled film and an empty film container or patrone in a light-tight film case of the film package, the rolled film being wound up in the patrone by one frame every exposure. Due to the provision of the empty patrone in the light-tight film case of the film package, when the exposure of all frames of the film is completed, the film is entirely within the patrone. Therefore, the patrone can be taken out very easily, without any need for film rewinding. The exposed film is removed from the patrone and handled in the same manner as conventional 135-size film for development and processing, while the film case is scrapped.

When fastening the unexposed roll film around a spool in a film receiving chamber of the light-tight film case, a serious problem encountered is that the spool disposed in the film receiving chamber is required to rotate to allow advance of film after the exposure of each frame of the film. To satisfy this requirement, the lens-fitted photographic film package becomes complicated in structure. For structural simplicity, it is desirable not to provide any spool in the film receiving chamber of the light-tight film case.

OBJECTS OF THE INVENTION

It is, therefore, an object of the present invention to provide a lens-fitted photographic film package which makes it possible to reduce the frictional force exerted on a film rolled in a film receiving chamber of the lens-fitted photographic film package.

It is another object of the present invention to provide a lens-fitted photographic film package in which a film can be advanced smoothly.

It is still a further object of the present invention to provide a lens-fitted photographic film package in which a film is prevented from getting scratch marks on the surface thereof.

SUMMARY OF THE INVENTION

To accomplish the above and other objects, the lens-fitted photographic film package according to the present invention comprises a light-tight film case having at least exposure effecting means and a taking lens, a rolled film contained in a film roll receiving chamber having no film winding spool, disposed on one side of an exposure position of the light-tight film case, a removable light-tight film container having a film winding spool therein disposed on the other side of the exposure position of the light-tight film case, and means for causing the film to be advanced smoothly without getting scratched.

According to a feature of a preferred embodiment of the present invention, the film roll receiving chamber of the lens-fitted film package is so formed as to have a reduced width of a lengthwise opening thereof, in order to prevent the rolled film in the film roll receiving chamber from bulging out of the film roll receiving chamber before assembling the film package. By providing the film roll receiving chamber with a reduced width of its lengthwise opening, the rolled film can be loaded in the film roll receiving chamber without loosening and bulging out of the film roll receiving chamber, resulting in a smooth film advance and the prevention of scratching of the film.

According to another preferred embodiment of the lens-fitted photographic film package according to the present invention, the film roll receiving chamber is provided with upper and lower rims which support the rolled film in the film roll receiving chamber at the film's upper and lower margins. As the rims contact these upper and lower film margins, the film is subject to greatly reduced frictional forces from an inner surface of the film roll receiving chamber. Therefore, the film can be advanced smoothly and prevented from getting scratch marks on the image frames thereof.

According to a still another feature of the lens-fitted photographic film package of the present invention, a film end retaining member is provided in the film roll receiving chamber for deflecting an inner film end of the film roll away from an inner surface of the film receiving chamber adjacent to the exposure position of the light-tight film case. As the film end retaining member retains the inner end of the film roll, the end portion of the film roll is never rendered folded or bent, thereby being prevented from being pinched by a film exit slot adjacent to the film roll receiving chamber when the end of the film is withdrawn from the film roll receiving chamber.

According to a further preferred embodiment of the lens-fitted photographic film package of the present invention, a friction applying member is provided adjacent either to the film roll receiving chamber or to a film slot of the film container receiving in the light-tight film case to deflect slightly the film in order to exert on the film a frictional force between about 460 and 800 gcm in film advancing torque.

BRIEF DESCRIPTION OF THE DRAWINGS

The above and other objects and features of the present invention will become apparent from the following detailed description taken in conjunction with the preferred embodiments thereof with reference to the accompanying drawings in which like parts are designated by like numerals throughout the views of the drawings and wherein:

FIG. 1 is a perspective view of a lens-fitted photographic film package of the present invention;

FIG. 2 is an exploded perspective view of the lens-fitted photographic film package of a preferred embodiment according to the present invention;

FIG. 3 is a cross-sectional view of the lens-fitted photographic film package of FIG. 1;

FIG. 4 is a cross-sectional view of a conventional lens-fitted photographic film package showing the shortcomings of the prior art;

FIGS. 5(A), (B) and (C) are fragmentary cross-sectional views showing the lens-fitted photographic film package of FIG. 2 in which the film roll receiving chamber is modified in various ways;

FIGS. 8(A), (B) and (C), are fragmentary cross-sectional views showing a film roll receiving chamber of a conventional photographic film package;

FIG. 9 is a cross-sectional view similar to FIG. 3 showing the lens-fitted photographic film package of another preferred embodiment according to the present invention;

FIGS. 10(A) and (B) are explanatory views showing the film roll receiving chamber of the lens-fitted photographic film package of FIG. 9;

DETAILED DESCRIPTION OF THE INVENTION

Figure 7:
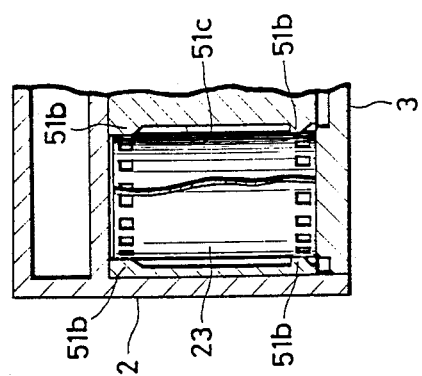
FIG. 7 is a fragmentary elevational sectional view showing the film roll receiving chamber of the lens-fitted photographic film package of FIG. 6.

Referring now to FIGS. 1 and 2, shown therein is a lens-fitted photographic film package (which is hereinafter referred to as a film package for simplicity) embodying the present invention. The film package 1 comprises a front case section 2 and a rear case section 3 which are assembled integrally to form a generally rectangular box-shaped light-tight film case. The front case section 2 is provided with a taking lens 4, a viewfinder window 5, and a shutter actuating member 6 in its outer walls. In the film package 1, there are necessary elements such as a simple exposure control, a shutter mechanism, a film advancing mechanism, and the like incorporated therein. The rear case section 3 is fixed to the front case section 2 in any well known manner, for example by ultrasonic welding, so as not to be separable by the user. The film package 1 is preferably encased tightly in an outer case (not shown) which is formed with several openings for exposing the taking lens 4, finder window 5, and shutter actuating member 6, and is made of printable cardboard or printable plastic sheet material.

In FIG. 2 showing the film package 1 disassembled into two case sections, the front case section 2 has an opening 2B extending across its rear and bottom. The rear case section 3 has a substantially L-shaped configuration to complementarily close the opening 2B of the front case section 2 so as to provide a box-shaped light-tight film case. Inside the front case section 2, there are a film roll receiving chamber 11 having a bottom opening 11a and a film patrone receiving chamber 12 having a bottom opening 12a which are disposed on opposite sides of an exposure frame 10. Projecting downwardly from the top wall of the film patrone receiving chamber 12 is a fork 14 which is secured to a film advancing knob 8 to rotate in the clockwise direction as viewed in FIG. 1. The exposure frame 10 is formed with film guiding and supporting rails 15 on the upper and lower sides thereof. In the upper rail 15, there is a sprocket wheel 16 partially projecting from an outer surface of the upper rail 15.

As is shown in FIG. 3, the film roll receiving chamber 11 is a generally cylindrical chamber having a side opening whose width W is smaller than the diameter D of the outermost convolution of the film roll 23 which is the same as the maximum width of the film roll receiving chamber 11. This width W of the side opening is defined between a bulge portion 2a and an inner wall of the front case section 2.

On the other hand, inside the rear case section 3, there is a back-up portion 30 shaped complementarily to the curved surfaces of the film guiding and supporting rails 15 of the exposure frame 10 for supporting the film from the rear so as to hold it in the focal plane of the taking lens 4. In addition, the back-up portion 30, when the rear case section 3 is fitted to the front case section 2, closes the side opening of the film roll receiving chamber 11 to form a complete film roll receiving chamber 11 leaving a film exit slot 13.

There is also a raised portion 32 (see FIG. 2) formed inside the bottom wall of the rear case section 3 which closes the bottom opening 11a of the film roll receiving chamber 11 and supports the lower edges of the convolutions of the film roll 23. From the point of view of cost, it is preferable to use a plastic single lens for the taking lens 4. Although the plastic single lens produces some distortion, nevertheless the curved form of the film guiding and supporting rails 15 is helpful to reduce such distortion.

Upon assembling the film package 1, a roll 23 of 135-size film 21 and an empty film patrone 20 in which the film 21 at it one end is retained by a spool 28 (see FIG. 3) are inserted into the receiving chambers 11, 12, respectively, prior to assembling the two case sections 2 and 3. This film 21 is of the type having a 36×24 mm image frame which is defined as 135-size film by ISO-1007 (International Standardization Organization: 1979 Edition).

The above-described film loading operation is, in this embodiment, performed by the aid of a film loading jig which is shown by a double dotted line in FIG. 2. In greater detail, the unexposed film 21 withdrawn from the film patrone 20 is wound around a cylindrical spool member 22 of the loading jig as a film roll 23 in many convolutions. The film patrone 20 is held by a gripping arm 25 of the loading jig and a portion 26 of the film 21 extending between the film roll 23 and the film patrone 20 is supported by a plate member 27 of the loading jig in such a way to be slightly raised and curved.

The film patrone 20 and the film 21 thus held by the loading jig can be inserted into the respective receiving chambers 11 and 12 through respective bottom openings 11a and 12a by moving the loading jig toward the front case section 2 until the top of the spool 28 of the film patrone 20 is brought into engagement with the fork 14. During this film loading operation, since the portion 26 of the film 21 is raised, the upper edge of the portion 26 will not be caught by the teeth of the sprocket wheel 16.

After having loaded the film roll 23 and the film patrone 20 in the above-described manner, the gripping arm 25 unclamps the patrone 20 and the cylindrical spool member 22 is resiliently deformed to release the film 21. The deformation of the cylindrical spool member 22 is made possible by the provision of a slit 22a which nips one end of the film 21. Then the loading jig is retracted, leaving the film roll 23 and the film patrone 20 in the respective receiving chambers 11 and 12. Although the rolled film 23 is liable to loosen due to its own curling effect or stiffness, the outermost convolution of the film roll 23 is restricted by the bulged portion 2a extending along the open sided film roll receiving chamber 11 to prevent the film roll 23 from loosening enough to protrude from the film roll receiving chamber 11. Then the rear case section 3 is fixed and welded to the front case section 2 to enclose the film 21 light-tightly in the photographic film case.

In the use of the film package 1 thus assembled, when the shutter actuating member 6 is operated, a shutter 35 is caused to open and close so as to expose the first frame of the film 21 in the exposure frame 10. After this exposure, the film advancing knob 8 is operated to rotate the fork 14, thereby rotating the spool 28 of the patrone 20 to wind the film 21 by one frame, namely to take up the exposed part of the film 21 in the film patrone 20. On the other hand, another frame of the film 21 adjacent to the exposed frame is moved into the exposure frame 10 by rotation of the sprocket wheel 16. Ween the sprocket 16 makes a predetermined number of revolutions, the film advancing mechanism and the shutter actuating mechanism with its associated elements are self-cocked in a well known manner to those skilled in the art so as to ready the film package 1 for the next exposure.

Upon this one frame film advance, the film roll 23 is partially unwound, being rotated as a whole in the counterclockwise direction as viewed in FIG. 3 in the film roll receiving chamber 11.

For a better understanding of the present invention, a prior art lens-fitted photographic film package 1' will be explained with reference to FIG. 4. The prior lens-fitted photographic film package 1' is provided with a roll film receiving chamber 11' of which the width of the side opening is equal to the greatest diameter of the film roll receiving chamber 11' Therefore, when the film roll 23 is placed in the film roll receiving chamber 11' by means of the loading jig, the film roll 23 will loosen and partially bulge out of the film roll receiving chamber 11' before attachment of the rear case section 3. For this reason, when the rear case section 3 is attached to the front case section 2, the film roll 23 is depressed and deformed. In such a prior art film package 1', when the film is withdrawn from the film roll receiving chamber 11', between the outermost convolution of the film roll 23 and the inner surface of the roll film receiving chamber 11' there is generated a relatively large friction force. The film advancing knob 8 becomes difficult to operate. If the film advancing knob 8 is forced to operate so as to advance the film 21 against this relatively large friction force, the film roll 23 will be scratched on the surfaces of the outermost convolution of the film roll 23 and part of the outermost convolution of the film roll 23 will be scraped by film exit slot 13'.

It will be evident, upon comparing the film package 1 of the present invention with this prior one, that since the reduced width of the side opening of the open sided film roll receiving chamber 11 of the film package 1 according to the present invention can prevent the film roll 23 in the film roll receiving chamber 11 from bulging out before the rear case section 3 is attached to the front case section 2, the back-up portion 30 of the rear case section 3 does not depress and deform the film roll 23 when the rear case section 3 is attached to the front case section 2. Therefore, in the film package 1 of the present invention, the film roll 23 is maintained substantially cylindrical in the film roll receiving chamber 11, with the result that the film advancing knob 8 can be operated smoothly and the film roll 23 in the film receiving chamber 11 can be prevented from being scratched on the surface of the outermost convolution thereof.

As the exposure is repeated in the manner described above, the film 21 is wound up in the patrone 20 frame by frame. After the exposure of all frames of the film 21, the film package is forwarded to a photo shop without removing the exposed film 21. There, the rear case section 3 is detached form the front case section 2 by the aid of, for example, a dismantling jig and then the film patrone 20 with the exposed film 21 contained therein is removed. The film patrone 20 is handled in the same manner as conventional patrones to remove the exposed film 21 in order to process it for development and printing.

It is desirable to provide an openable portion 40 in the bottom wall of the rear case section 3. This openable portion 40 is defined by a circular groove 37 formed in the inner surface of the bottom wall of the rear case section 3 and is easily breakable along the groove 37. The openable portion 40 is broken from the rear case section 3 to form an opening in the bottom wall of the rear case section 3 so as to allow the film patrone 20 to be removed axially. For easy breaking of the openable portion 40, there is provided a tab 38 disposed in a recess 41 formed in the bottom wall of the rear case section 3. When the tab 38 is pulled, the openable portion 40 of the bottom wall of the rear case section 3 is easily broken and torn off along the groove 37, providing the opening through which the film patrone 20 can be removed without detaching the rear case section 3 from the front case section 2. The forming of this opening in the light-tight case of the film package 1 prevents the light-tight film case from being reused. In this way, the user is prevented from reusing the film case; and this in turn avoids the poor exposures that would result from such reuse.

FIG. 5 shows several variations of the film roll receiving chamber 11 of the film package 1 shown in FIGS. 1 to 3. The film roll receiving chamber 11 shown in FIG. 5(A) has a main chamber portion having a generally rectangular cross section. The main chamber portion is provided with the bulge portion 2a which defines a reduced width side opening in combination with a bulge 3a formed integrally with the back-up portion 30 of the rear case section 3.

In any film package described above, if the film 21 is withdrawn rapidly or at a high rate of film advance, the film roll 23 may possibly be deformed. As a result, the film roll 23 will be gouged by the film exit slot 13 and will be scratched on the surface of the outermost convolution thereof. For preventing such a deformation of the film roll 23, it is desirable to provide a braking projection 3b adjacent to and after the film exit slot 13 as is shown in FIG. 5(B).

As is shown in FIG. 5(C), the bulge portion 2a of the previous embodiments shown in FIGS. 5(A) and 5(B) may be replaced by a separately provided bulge member 40 which is fixed to the inner surface of the film roll receiving chamber 11.

Figure 6:
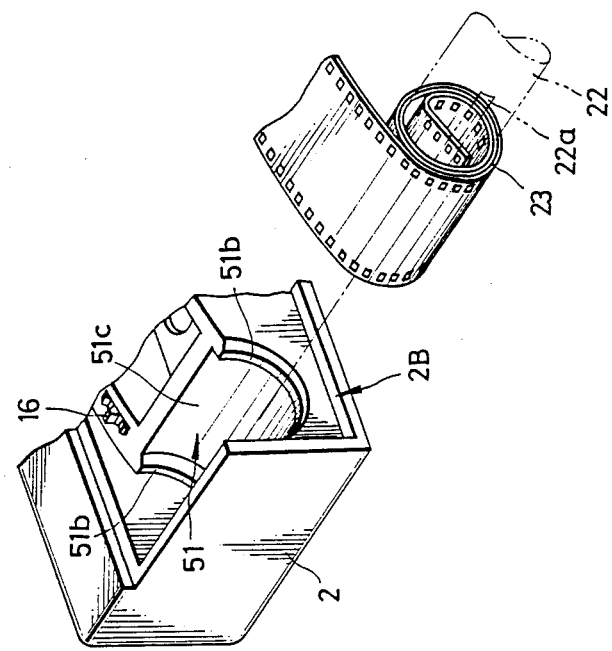
FIG. 6 is an exploded fragmentary perspective view of another preferred embodiment of the lens-fitted photographic film package according to the present invention.

Referring now to FIGS. 6 and 7 showing another preferred embodiment of the present invention, a film roll receiving chamber 51 is provided with semi-circular ribs 51b about its top and bottom. When the film roll 23 is placed in the film roll receiving chamber 51 of the front case section 2 in the same way as described in connection with the previous embodiment, the film roll 23 loosens until the outermost convolution of the film roll 23 is sustained by the ribs 51b. Therefore, the outermost convolution of the film 21 is maintained spaced from the inner surface 51c of the film roll receiving chamber 51. Due to the provision of the ribs 51b, the friction force exerted on the outermost convolution of the film roll 23 is greatly reduced upon film advance after exposure, resulting in a smooth and easy film advance operation. Furthermore, because of the spacing of the outermost convolution of the film roll 23 from the inner surface 51c of the film roll receiving chamber 51, the film 21 is prevented from being scratched.

Because the film roll 23, as was previously described in connection with FIG. 2, is formed by the aid of the film loading jig, in particular the cylindrical spool member 22 having the slot 22a by which one end of the film 21 is nipped, the end of the film 21 is bent, usually permanently. Accordingly, the bent portion of the film 21 tends to be gouged by the film exit slot 13. In more detail, since the stiffness of film is lost with time, the film roll 23 contained in the film roll receiving chamber 11, 51 at first does not loosen any more. For this reason, the last several convolutions of the film roll 23 becomes smaller in diameter and is drawn toward the film exit slot 13 as is shown in FIG. 8(A) upon advance of the film 21 because the stiffness of the film 21 diminishes with time. When the last convolution of the film roll 23 including the permanently bent end portion 23a reaches the film exit slot 13 as is shown in FIG. 8(B), and more particularly as is shown in FIG. 8(C), the bent end portion 23a becomes gouged by the film exit slot 13.

Referring to FIGS. 9 and 10 showing another preferred embodiment of the present invention, for preventing the permanently bent end portion 23a from being gouged by the film exit slot 13, there is provided in the film roll receiving chamber 61 of the film package 1 a cylindrical hollow tube 63 extending downwardly from the top of the film roll receiving chamber 61. Upon placing the roll film 23 in the film roll receiving chamber 61 for assembling the film package 1, the film roll 23 is disposed about the cylindrical tube 63. As the cylindrical tube 63 can serve to maintain the bent end portion 23a of the film roll 23 far from the film exit slot 13 as shown in FIG. 10(B), the bent end portion 23a is never gouged by the film exit slot 13.

Figure 11A:
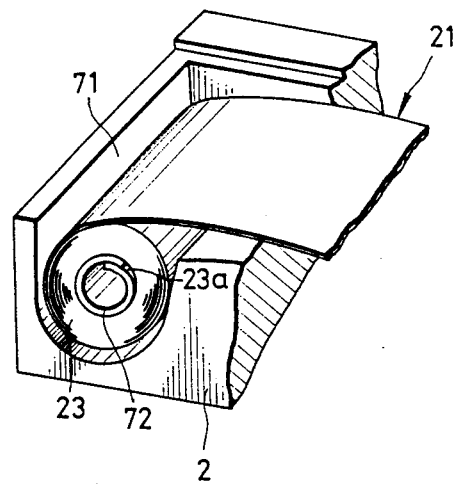
FIGS. 11(A) and (B); are explanatory illustrations showing a modification olf the film roll receiving chamber of FIG. 9.
Figure 11B:
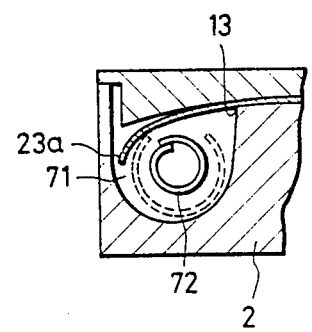

It is to be noted that the cylindrical tube 63 may be replaced with an expandable hollow tube member made of a resilient material. Such an expandable hollow tube member 72, as is shown in FIG. 11, is adapted to press the film roll 23 against the inner surface of the film roll receiving chamber 71. As the film 21 is advanced frame by frame and wound in the film container 20, the film roll 23 is reduced in diameter. When almost all of the film 21 is wound, leaving only the end portion 23a of the film roll 23 in the film roll receiving chamber 71, the expandable hollow tube member 72 fully expands as is shown by chain lines in FIG. 11(B) to support the end portion 23a of the film roll 23 unfolded, namely, substantially straight. Therefore, the end portion 23a of the film roll 23 is prevented from being gouged by the film exit slot 13.

FIG. 12 shows a resilient supporting plate 75 by which the cylindrical tube 63 of FIG. 10 or the expandable cylindrical hollow tube 72 is replaced. The resilient supporting plate 75 is attached to the inner wall of the film roll receiving chamber 74 by means of screws and has a substantially semi-circular cross section so as to support the film roll 23 therein. The resilient supporting plate 75 is forced by its own resiliency to contract and to maintain its free edge 76 spaced from the edge of the exposure frame 10. It is desirable to make this free edge rounded over outwardly so as to prevent the film 21 from being scratched when advanced.

Figure 12A:
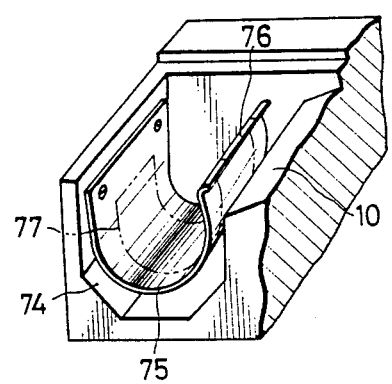
FIGS. 12(A) and (B) are explanatory illustrations showing a further modification of the film roll receiving chamber of FIG. 9.
Figure 12B:
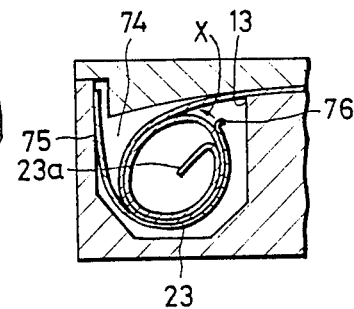

When many convolutions of the film roll 23 are in the film roll receiving chamber 74 and are supported by the resilient supporting plate 75, the supporting plate is expanded to move edge 76 downwardly outwardly by the pressure of the film roll 23 as is shown in FIG. 12(B). As the number of convolutions of the film roll 23 is reduced, free edge 76 is permitted to move inwardly in a direction shown by an arrow X in FIG. 12(B) so as to maintain the film roll 23 spaced from the edge of the exposure frame 10. In such a way, the resilient supporting plate 75 can prevent the permanently bent end portion 23a of the film roll 23 from being gouged by the film exit slot 13.

The resilient supporting plate 75 may be attached to the inner wall of the film roll receiving chamber 74 at its bottom to free both edges thereof. Although the resilient supporting member 75 is shown in FIG. 12 as having substantially the same longitudinal width as the film 21, it is permissible to have a width narrower than the width of the film 21. The resilient supporting plate 75 may be punched out to form an opening 77 shown by the double dotted line in FIG. 12(A). It is preferred to make the resilient supporting plate of, for example, thin stainless steel plate or plastic materials having no bad photographic effects.

In any above-described embodiments of the lens-fitted photographic film package, to economize, there is provided neither a pressure plate between the film roll receiving chamber and the film patrone receiving chamber nor a film spool in the film roll receiving chamber. For this reason, the film roll 23 and/or the film 21 rolled in the film patrone 21 is apt to become loose. If the film roll 23 and/or the film 21 rolled in the film patrone 20 becomes loose, the film 21 cannot be advanced stably, namely by a predetermined distance every time, resulting in unequal margins between frames.

Figure 13:
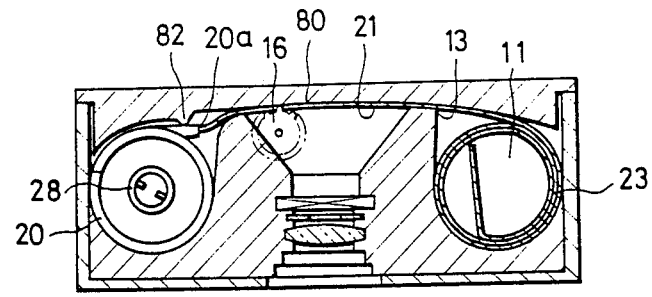
FIG. 13 is a cross-sectional view, similar to FIG. 3, of the lens-fitted photographic film package of a further preferred embodiment according to the present invention.

For avoiding such unequal margins, the film package 1 is provided with a friction applying member. As is shown in FIG. 13, there is provided a projection 82 as a friction applying member which abuts against the film patrone 20 to incline the film slot 20a of the film patrone 20 downwardly with respect to a film passage 80 along which the film 21 will ordinarily pass. Due to the provision of the projection 82, the film 21 adjacent to the film slot 20a of the film patrone 20 is forced to assume an S-curve. Therefore, a friction force is exerted on the film 21 when the film 21 is advanced.

Figure 14:
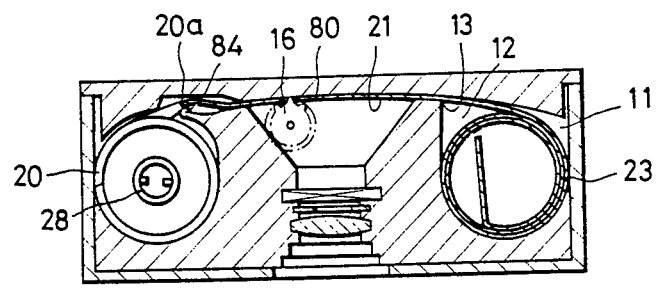
FIG. 14 is a cross-sectional view, similar to FIG. 13, showing a modification of the lens-fitted photographic film package of FIG. 13.

Alternatively, the friction applying member may be disposed to abut the patrone 20 so as to incline the film slot 20a of the patrone upwardly as is shown at 84 in FIG. 14. It will be apparent that the projection 84 causes the film case to exert a friction force on the film 20 in the same manner as the projection 82 of FIG. 13.

According to experimental results, the omission of the friction applying member such as the projection 82, 84, resulted in variations of more than 2 mm between margins between frames when a film having 24 available frames is advanced with a film advancing torque of about 320–400 gcm. There was for the experiments a lens-fitted photographic film package of which the width of the film passage 80 and the minimum inner diameter of the film roll receiving chamber 11 are about 0.2 mm and 20 mm, respectively. The film advancing torque depends on the number of convolutions of the film roll 23 remaining in the film roll receiving chamber 11 and on the number of frames of a film incorporated in the film package. By contrast, the provision of the friction-causing member 82, 84 contributes greatly to reduce the difference in needed torque regardless of the amount of film withdrawn from the film roll. If the film advancing torque reaches more than about 800 gcm, the film advance operation becomes quite difficult and unfavorable for the lens-fitted photographic film package. According to actual uses of the film package, the friction force caused by the friction applying member 82, 84 which is suitable for a good feeling of operation and substantially equal margins is between 480 and 640 gcm in terms of film advancing torque. If the film advancing torque becomes less than 480 gcm, the friction force caused by the friction applying member does not serve effectively to reduce the differences in the width of the margins between the frames. In the above experiments, each torque is measured based on a force applied to the outer periphery of the film advancing knob 8.

Figure 15:
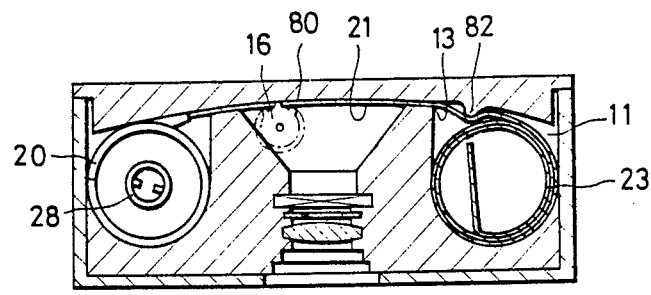
FIG. 15 is a cross-sectional view, similar to FIG. 13, showing modification of the lens-fitted photographic film package of FIG. 13.

It is to be understood that each projection 82, 84 that serves as the friction-causing member may be disposed before and adjacent to the film exit slot 13 as is shown in FIG. 15. Although the projection 82, 84 shown in FIGS. 13 and 14 is formed integrally with one of the front and rear case sections 2 and 3, it is permissible to provide a resiliently supported projection or a resilient projection. In any case, the friction applying member can prevent the film 21 from loosening.

Although the present invention has been fully described by way of the preferred embodiments thereof with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A lens-fitted photographic film package having means for effecting an exposure and a taking lens, which comprises a light-tight film case which must be destroyed to open the same, a film in the form of a roll light-tightly contained in said light-tight film case, and a film container in which exposed film is wound; the improvement in which said light-tight film case has a film roll receiving chamber to receive therein said film light-tightly and said film roll receiving chamber has upper and lower projections formed on an inner surface thereof for supporting an outermost convolution of said film in the form of a roll at its upper and lower sides.

2. A lens-fitted photographic film package as defined in claim 1, wherein each of said upper and lower projections contacts a margin of said film wherein perforations are formed.

3. A lens-fitted photographic film package as defined in claim 1, and a projection on the case to the rear of said film roll receiving chamber that maintains said film roll substantially cylindrical.

4. A lens-fitted photographic film package having means for effecting an exposure and a taking lens comprising:
    an unexposed film in the form of a roll;
    a light-tight film case comprising at least a front case section formed with a film roll receiving chamber having an open rear side, and a rear film case section which closes said open rear side light-tightly, said open rear side of said film roll receiving chamber having a width less than the width of said film roll receiving chamber;
    said unexposed roll of film being disposed in said chamber with its outermost turn in contact with side walls of said chamber; and
    a film container disposed in said light-tight film case in which exposed film is wound.

5. A lens-fitted photographic film package having exposure effecting means and a taking lens comprising:
    a light-tight film case which must be destroyed to open the same;
    a film which is formed in a roll and contained in a film roll chamber of said light-tight film case;
    a film container received in said light-tight film case into which said film, after exposure, is advanced frame by frame and wound in a roll; and
    means to exert a frictional force on said film upon said film being advanced.

6. A lens-fitted photographic film package having a exposure effecting means and a taking lens comprising:
    a light-tight film case which must be destroyed to open the same;
    a film which is formed in a roll and contained in a film roll chamber of said light-tight film case;

a film container disposed in a film container chamber of said light-tight film case and having a film slot through which said film, after exposure, is wound in a roll into said film container;

a film passage formed between said film roll and film container chambers; and means for forcing said film to be curved in an S-curve between said film passage and said slot of said film container upon said film being advanced.

7. A lens-fitted photographic film package having means for effecting an exposure and a taking lens comprising:

a film in the form of a roll;

a light-tight film case comprising at least a front case section formed with a film roll receiving chamber having an open side, and a rear film case section which covers said film in the form of a roll in said film roll receiving chamber light-tightly, said open side of said roll film receiving chamber having a width less than the width of said film roll receiving chamber; and a film container disposed in said light-tight film case in which exposed film is wound, said front and rear cases sections being secured together by ultrasonic welding.

8. A lens-fitted photographic film package comprising:

a film in the form of a roll;

a light-tight film case incorporating exposure effecting means and a taking lens, said light-tight film case being provided with a film roll receiving chamber formed adjacent and to one side of an exposure frame of said light-tight film case for containing therein said film, said film roll receiving chamber having a film end retaining member which maintains an end portion of said film spaced away from an inner surface of said film roll receiving chamber adjacent to said exposure frame; and means to advance said film frame by frame from said one side to the other side of said exposure frame, and in which said film after exposure is wound in a roll on said other side, said film end retaining member comprising a cylindrical rotatable member that is resiliently expandable.

9. A lens-fitted photographic film package having exposure effecting means and a taking lens comprising:

a light-tight film case;

a film which is formed in a roll and contained in a film roll chamber of said light-tight film case;

a film container received in said light-tight film case into which said film, after exposure, is advanced frame by frame and wound in a roll; and means to exert a frictional force on said film upon said film being advanced, said means comprising a friction-applying member formed to deflect the film from a path along which said film would otherwise pass, said member being a projection that directly contacts said container within which said film is wound in a roll.

10. A lens-fitted photographic film package as claimed in claim 9, in which said member imparts to said film an S-curve between said member and a slot through which said film leaves said chamber.

11. A lens-fitted photographic film package having exposure effecting means and a taking lens comprising:

a light-tight film case;

a film which is formed in a roll and contained in a film roll chamber of said light-tight film case;

a film container disposed in a film container chamber of said light-tight film case and having a film slot through which said film, after exposure, is wound in a roll into said film container;

a film passage formed between said film roll and film container chambers; and means for forcing said film to be curved in an S-curve between said film passage and said slot of said film container upon said film being advanced, said forcing means comprising a projection which abuts against said film container to incline said film slot of said film container.

* * * * *